United States Patent
Thomas et al.

(10) Patent No.: US 6,681,250 B1
(45) Date of Patent: Jan. 20, 2004

(54) NETWORK BASED KVM SWITCHING SYSTEM

(75) Inventors: Christopher L. Thomas, Madison, AL (US); Robin L. Anderson, Winchester, TN (US); Robert L. Gilgen, Westford, MA (US); Mark DesMarais, Northboro, MA (US); William J. Pinkston, Fayetteville, TN (US); Jamie F. Collins, Huntsville, AL (US); Stephan Schulz, Bethesda, MD (US)

(73) Assignee: Avocent Corporation, Huntsville, AL (US)

(*) Notice: Subject to any disclaimer, the term of this patent is extended or adjusted under 35 U.S.C. 154(b) by 0 days.

(21) Appl. No.: 09/563,434

(22) Filed: May 3, 2000

(51) Int. Cl.[7] .............................................. G06F 15/173
(52) U.S. Cl. ...................................... 709/226; 709/203
(58) Field of Search ................................. 709/226, 228, 709/227, 229, 223, 203

(56) References Cited

U.S. PATENT DOCUMENTS

| | | | |
|---|---|---|---|
| 5,721,842 A | 2/1998 | Beasley et al. | 395/311 |
| 5,732,212 A | 3/1998 | Perholtz et al. | 395/200.11 |
| 5,740,246 A | 4/1998 | Saito | 380/21 |
| 5,884,096 A | 3/1999 | Beasley et al. | 395/858 |
| 5,917,552 A | 6/1999 | Van Court | 348/558 |
| 6,041,182 A | 3/2000 | Hart et al. | 395/712 |
| 6,070,253 A | 5/2000 | Tavallaci et al. | 714/31 |
| 6,112,264 A | 8/2000 | Beasley et al. | 710/38 |
| 6,304,895 B1 * | 10/2001 | Schneider et al. | 709/203 |

OTHER PUBLICATIONS

U.S. patent application Ser. No. 09/100,582, O'Dryna et al., filed Jun. 1998.
U.S. patent application Ser. No. 08/909,924, O'Dryna et al., filed Aug. 1997.

* cited by examiner

Primary Examiner—Glenton B. Burgess
Assistant Examiner—Tod Kupstas
(74) Attorney, Agent, or Firm—Davidson Berquist Klima & Jackson LLP (57) ABSTRACT

A keyboard/video/mouse (KVM) switching protocol is disclosed in which KVM information is applied to a network of workstations. At least one data converter communicates on the workstation network and retrieves KVM information from the workstation network that is addressed to a server assigned to the converter. The converter places the KVM information in a format suitable to the assigned server and applies the converted KVM information to the appropriate standard device ports of the server. The system provides motherboard access to the servers that is characteristics of KVM switches but provides essentially unlimited scalability not known in traditional KVM switches.

20 Claims, 8 Drawing Sheets

NETWORK BASED KVM SWITCHING SYSTEM

FIELD OF THE INVENTION

The invention relates to network switching systems and more particularly to network switching of computer peripheral data.

BACKGROUND AND SUMMARY OF THE INVENTION

In years past, as corporate networks began to expand, there became a growing need for so-called KVM switches to allow a single network operator to access and control multiple different computers with a single keyboard, video, and mouse workstation. At first, KVM switches provided the maintenance operator with the ability to access between two and eight different computers using a single keyboard, video and mouse. But, corporate networks grew in size, such that the size and complexity of KVM switches increased. Eventually, computer network operators demanded KVM access between a workstation and thousands, and even tens of thousands, of different computers. The initial response was to scale KVM switches such that a KVM switch that provided one workstation with access to 8 servers could instead be scaled to 8 additional KVM switches, thus providing access to 8×8=64 computers. In this way, larger numbers of computers could be accessed via a single keyboard, video and mouse workstation.

Scaling remains a viable alternative in many computer environments today. However, as the introduction of extremely vast numbers of computers, such as in server farms and the like, become commonplace, the need for a network operator to access many tens of thousands, or conceivably even many more computers becomes acute. Of course, KVM switches can be scaled in increasing numbers in order to accommodate the growing numbers of computers that must be attached to a few workstations, but the increased number of scaled KVM switches becomes a space consideration in large server farm areas.

Figure 1:
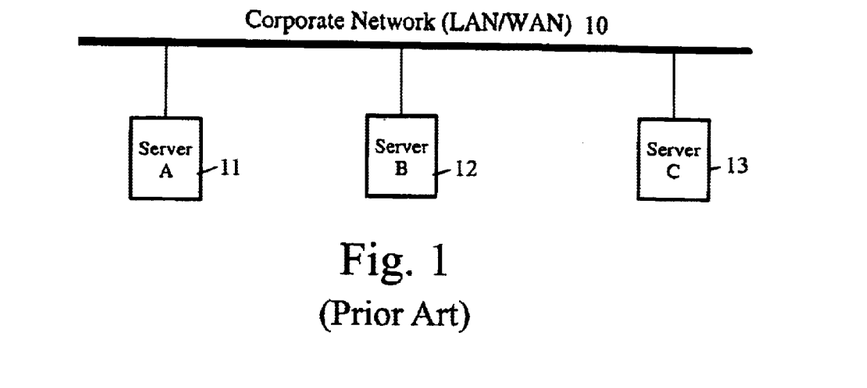
FIG. 1 is a schematic representation of a prior art corporate network.
Figure 2:
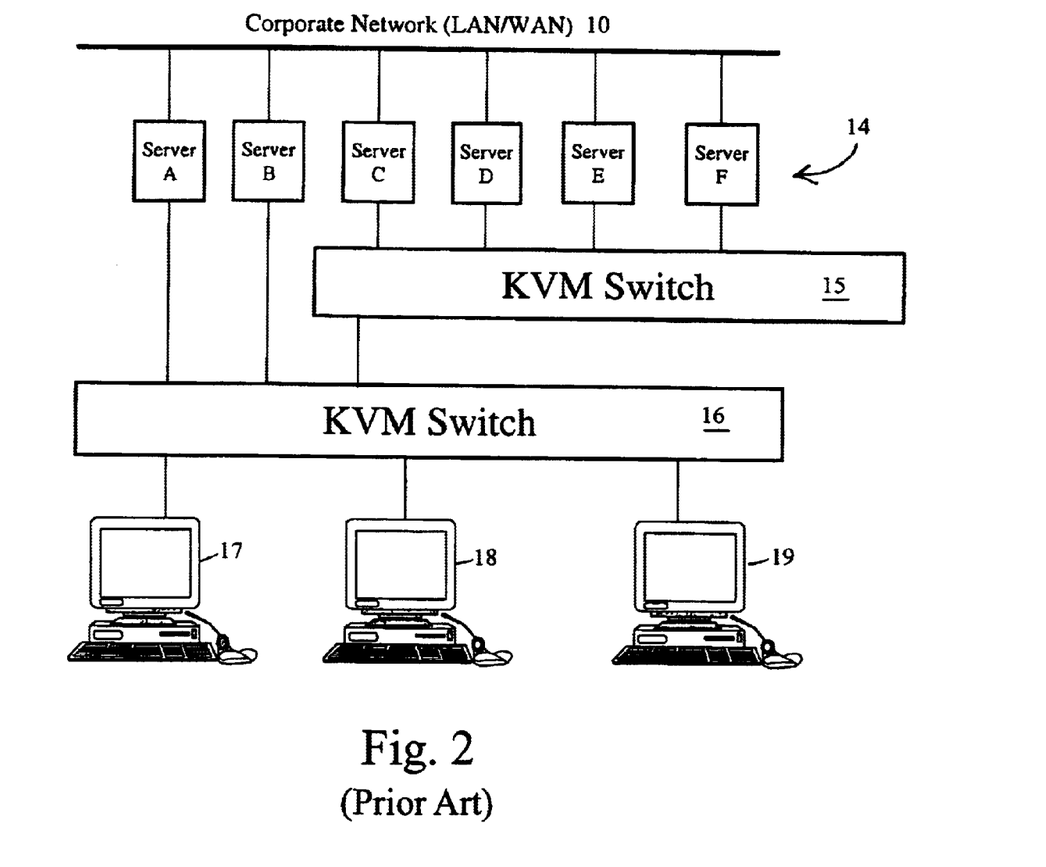
FIG. 2 is a schematic representation of prior art KVM switches.

Examples of the traditional KVM switches are shown in FIGS. 1 and 2. In FIG. 1, a traditional corporate network 10, such as a LAN, WAN, Internet, etc., provides a communication path for a number of servers 11–13. The operation of the servers and the communication protocols used by the network on the corporate network 10 are well known to the artisan. For purposes of brevity, they will not be repeated here. The artisan will recognize, however, that many different protocols can be employed for the servers 11–13 to communicate on the network 10 and that many protocols will be developed in the future to increase the efficiency of data travel on the network by the servers 11–13. The present invention is not limited to any particular one.

In the KVM switch environment, as shown in FIG. 2, a number of workstations 17–19 communicate through a KVM switch 16 to servers A and B of the server set 14. The servers 14 communicate with each other and with other servers, appliances, etc., over the corporate network 10. FIG. 2 illustrates the scalability of the KVM switches in that the KVM switch 16 includes one output port connected to a second KVM switch 15. The second KVM switch 15 then connects to four additional servers C–F of the servers 14. Thus, if the KVM switch 16 provided only four output port capability, the additional KVM switch 15 allows the users 17–19 to communicate with more than four servers (in this case of FIG. 2, six servers 14).

The KVM switches 15 and 16 are known devices and are commercially available. Examples of these KVM switches are commercially marketed by Cybex of Huntsville, Ala. as the Autoview family of products and the XP family of products. The KVM switches 15 and 16 provide a number of functions in the embodiment of FIG. 2. First, when the servers 14 boot up, the KVM switches emulate keyboard, video and mouse initiation commands such that each of the computers 14 believes that it is actually connected to a single keyboard, video, and mouse workstation. The KVM switches are programmed to emulate keyboard, video and mouse limitation commands in accordance with one of any number of different KVM standards, such as Sun, PS2, etc. for keyboard/mouse and VGA, SVGA, etc. for video. In addition, the KVM switches 15 and 16 poll the workstation system requirements (such as the type of mouse, type of monitor, and type of keyboard) and provide data conversions that are necessary for otherwise inconsistent keyboard, video, and mouse devices to communicate with the servers 14.

One of the earliest types of KVM switches known is described in U.S. Pat. No. 5,732,212, Perholtz et al. System and Method For Remote Monitoring and Operation of Personal Computers. Perholtz describes remote KVM switching via the telephone network and local switching via a daisy-chain network of computers. Perholtz describes the use of a host system communicating via the telephone network with a workstation to gain motherboard access to a selected computer. In other words, Perholtz discloses that the remote user can reboot, cold boot, and perform other functions that might otherwise require local motherboard access, when the remote user employs the host unit to gain the motherboard access.

The present invention provides a significant improvement over traditional KVM switches and remote access KVM switches by providing KVM access—without traditional scaled KVM switches per se and without a traditional remote access unit—to any number of servers on a network, together with motherboard access to those servers. In traditional network access systems, the workstations and servers communicating via the network exchange keyboard, video and mouse command data between one another, usually in the form of packeted information. Thus, in traditional systems like the commercially available PC Anywhere and other such remote systems, one can access a server via the telephone network, the Internet, etc., and gain keyboard, video and mouse access to the server. However, users of such traditional systems cannot gain access to the numbers of servers that may exist on, for example, a corporate LAN or Internet, while also gaining motherboard access to those servers. In other words, in the past, the user could choose traditional KVM switches that provided motherboard access but had limitations on practical scalability or could choose remote access switches which provided access to vast numbers of servers, but failed to provide direct motherboard access.

The present invention solves both of the above problems by allowing any number of workstations to gain keyboard, video and mouse access to any number of servers on a corporate network, the Internet, or other network in a relatively simplified structure. In accordance with the preferred embodiment of the present invention, a number of servers communicate over a corporate network, with the keyboard, video and mouse ports of the various servers connected via a cable to respective converter boxes. The converter boxes also communicate with a maintenance network, onto which the various user workstations also communicate. In accordance with this embodiment, when a user of one of the workstations desires to access one of the servers, the user workstation communicates via the maintenance network to a corresponding converter for the desired server to gain motherboard access to that desired server. The user can then employ the server to communicate with other servers via the corporate network.

Although reference herein is made to converter "cores" and/or "units" one can appreciate that the converter described herein need not be a "box" or a "unit," but can be a computer card, server card, or can be otherwise incorporated into any system component.

In the preferred embodiment of the present invention, any number of users can communicate on the maintenance network and any number of servers can communicate on the corporate network such that any one of the users can communicate with any one of the servers and all of the servers can communicate one with another, without traditionally scaled KVM switches and without traditional KVM remote access devices, yet retaining full motherboard access. The preferred embodiment thus provides essentially unlimited scalability while allowing each user to gain motherboard access to any one of the associated servers.

In alternative embodiments, securities procedures are employed to limit motherboard access to certain or all of the servers by certain or all of the workstations.

In other alternative embodiments, the corporate network and the maintenance network are not independent networks, but are a common network.

In still further embodiments, the converters are not independently assigned to each server, but service one or more servers.

In still alternative embodiments, the maintenance network and the corporate network are bridged together.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE PRESENTLY PREFERRED EMBODIMENTS

Figure 3:
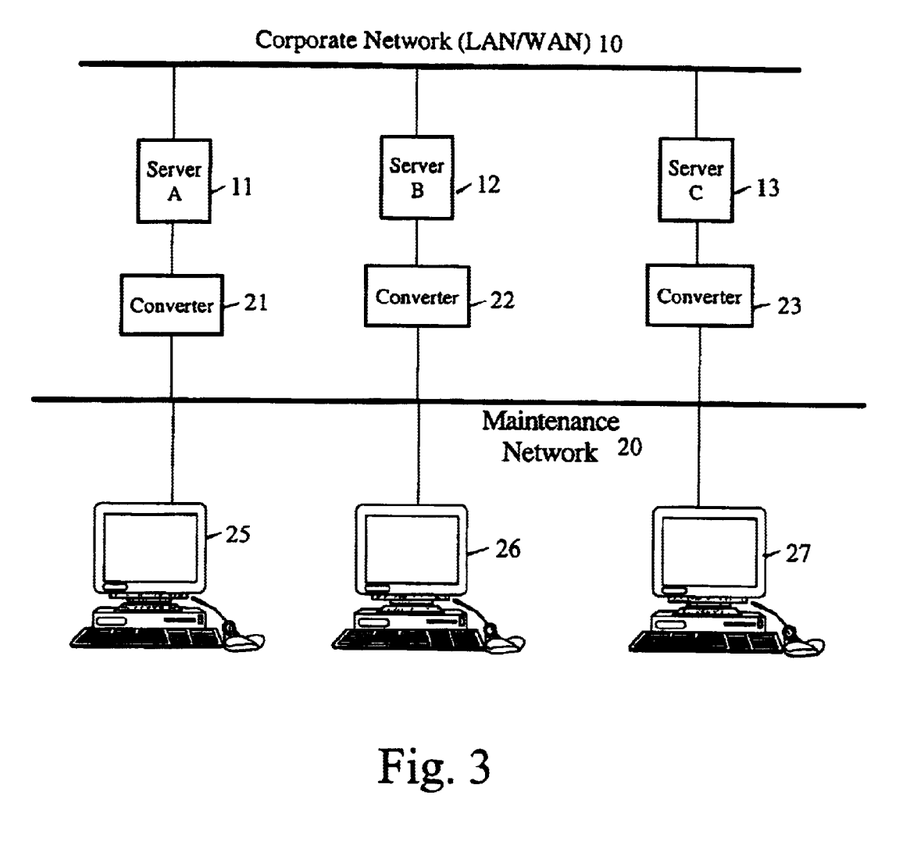
FIG. 3 is a schematic representation of a preferred embodiment of the present invention.

FIG. 3 illustrates a corporate LAN 10 onto which servers 11–13 communicate with one another. The corporate LAN 10 is a typical LAN and the servers 11–13 are common, over-the-counter servers, as depicted in the prior art FIG. 1.

In accordance with the present invention, each server 11, 12 13 communicates with a converter 21, 22, 23, which in turn communicates over a maintenance network 20. User workstations 25, 26, and 27 also communicate onto the maintenance network 20, including communicating with the converters 21, 22, and 23.

Although FIG. 3 illustrates 3 servers, 3 converters, 3 workstations, and 2 networks, the present invention is not limited to a particular embodiment shown in FIG. 3 and may envision more or less of the components shown. It is preferable to use separate converter units 21–23, thus allowing servers 11–13 to be over-the-counter, unmodified servers. But, it is equally valuable to incorporate the converters 21–23 into the servers 11–13, as for example, computer plug-in cards.

The converters 21, 22, and 23 act as intermediaries between the servers 11–13 and the maintenance network 20. The intermediary converters 21–23 thus allow the servers 11–13 to be typical, standard servers that can be purchased over-the-counter, such as (but not limited to) any typical PC. The converters 21–23, in the preferred embodiment, are cable connected to the servers 11–13 in a one-to-one correspondence. Converter 21, for example, connects to server 11, converter 22 connects to server 12, and converter 23 connects to server 13. In accordance with this embodiment of the present invention, each server on the corporate network 10 (which may exceed those shown in FIG. 3) has an associated converter (or at least communicates with a shared converter) before communicating to the maintenance network 20.

In one embodiment, the converter 21 can take the form of a well-known KVM switch, modified to convert KVM signals into a LAN protocol. One example of such a switch is described in U.S. patent application Ser. No. 09/379,576 to Pinkston, which is incorporated herein by reference. Thus, the converter 21, for example, connects to the server 11 just as a traditional KVM switch would connect to a PC in FIG. 2. That is, the converter 21 connects via a hardwire cable to the keyboard, video, and mouse ports of the server 11 such that the converter 21 has direct motherboard access to the server 11 just as if the keyboard, video, and mouse used by the selected user workstation 25–27 were directly connected to the selected server. Between the converter 21 and the maintenance network 20 is a network card that allows the converter 21 to convert signals received from the maintenance network 20 into the keyboard, video, and mouse signals desired by the server 11. Similarly, the converter 21 takes keyboard, video, and mouse signals from the server 11 and packets them (or otherwise formats them) into a data protocol acceptable for the maintenance network 20.

The user workstations 25–27 communicate with the various converters 21–23 via the maintenance network 20. In the preferred embodiment, the maintenance network 20, as shown in FIG. 3, is an entirely different network than the corporate network 10. The maintenance network 20 may operate under the same protocol as the corporate network 10, but need not do so. Thus, the maintenance network 20 and corporate network 10 may each follow Ethernet, LAN, ATM, wireless, CAT-5, TCP/IP protocols, or any other kind of data network connection or protocol that permits devices to communicate one with another.

When a user workstation, for example workstation 25, needs to communicate with a server, for example server 13, the workstation 25 sends data onto the maintenance network 20 destined for the converter 23. The converter 23 has an assigned device address on the network 20, just as would the workstation themselves. Most often, the data submitted from the workstation 25 to the converter 23 will be workstation inputs from the keyboard and mouse (or other input) devices of the workstation 25 to be used to control the selected server 13. The workstation directs the data to the converter 23 via standard network data addressing commensurate with the address protocols dictated by the maintenance network 20. The workstations 25–27 thus include network cards to link the workstation 25–27 to the maintenance network 20. The network cards assist in the addressing of data onto the maintenance network 20 for the desired converter 21–23. Once the workstation 25 sends keyboard and mouse data to the converter 23, the converter 23 takes the data from the maintenance network 20, converts it to a standard keyboard mouse protocol in the format required by the server 13 and provides those signals to the respective keyboard and mouse ports of the server 13. In the end, the user workstation 25 has direct access to the server 13 just as if those keyboard and mouse devices of the workstation 25 were directly connected to the server 13.

In the opposite direction, in most cases, the converters will be packeting sending digital video data from the server 13 to the workstation monitor via the network 20.

Although described in the preceding paragraph in unidirectional fashion, communication between converter 23 and workstation 25 is bi-directional. Keyboard and mouse command data is sent, for example, from server 13 to converter 23 to workstation 25 to set mouse sensitivity, keyboard lights, etc. Video commands are also sent, from time to time, from the monitor of workstation 25 back to the server 13 via the converter 23.

The converters 21–23 will perform all the necessary intermediary steps required for any of the workstations 25–27 to communicate with any of the servers 11–13. That is, the converters 21–23 will respond during boot-up to the servers 11–13 with the appropriate keyboard, video, and mouse initiation responses required by the server 11–13 in order to bluff the respective servers into believing that a proper keyboard, video, and mouse peripheral is connected thereto.

From a study of FIG. 3, one can see that any number of workstations 25–27 (only limited by the number which can be maintained by maintenance network 20) can communicate with any number of servers 11–13 such that the scalability of the KVM signal switching is not constrained by any particular physical requirements of a KVM switch.

It should be noted that the corporate network 10 is shown in FIG. 3 for illustrative purposes only and is not required by the present invention. In the modern environment, however, most servers 11–13 now communicate with one another over a corporate network 10.

Figure 4:
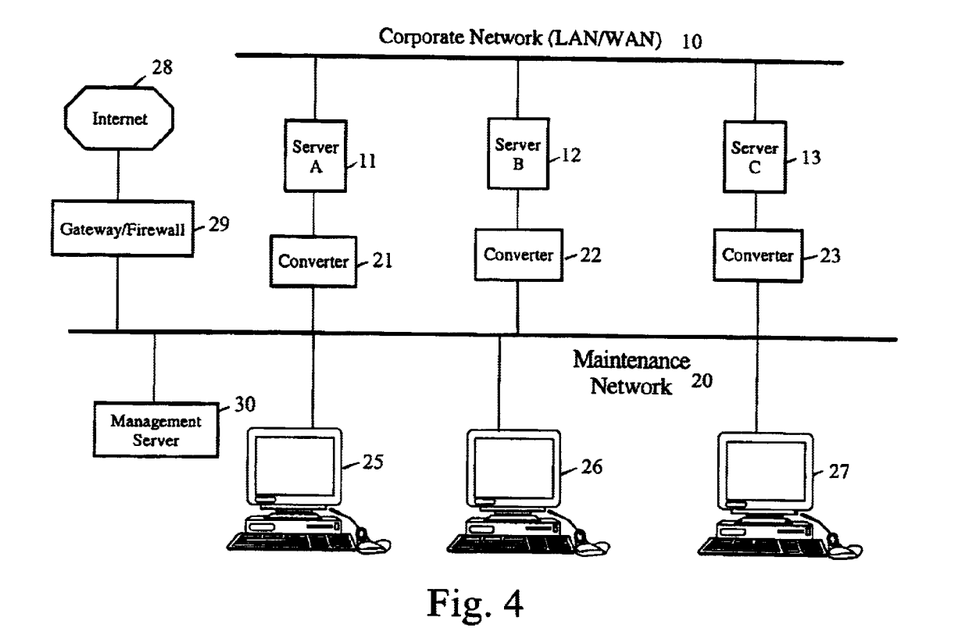
FIG. 4 is a schematic representation of the system of FIG. 3 with Internet and server management features.

FIG. 4 illustrates the embodiment of FIG. 3 with added features, permitting the users 25–27 to communicate via the Internet 28. In the embodiment of FIG. 4, the maintenance network 20 has communicating thereto a gateway/firewall 29, which connects the user workstations 25–27 to the Internet 28. Of course, in some embodiments, the corporate network 10 can be replaced by the Internet 28 such that the maintenance network 20 communicates over the Internet 28, as do each of the servers 11–13.

Also shown in FIG. 4 is a management server 30 communicating with the maintenance network 20 which allows a network manager to manage the maintenance network 20 and to communicate with each of the devices attached to the maintenance network 20.

Figure 5:
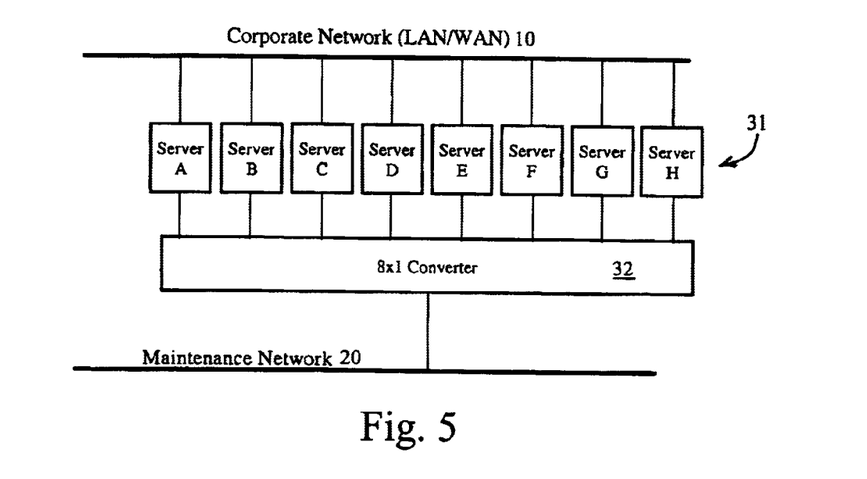
FIG. 5 is a schematic representation of an example alternative embodiment of the present invention.

FIG. 5 illustrates an alternative embodiment to the embodiment shown in FIG. 3. In FIG. 5, the corporate network 10 provides a network backbone for communication by a number of servers 31. In the embodiment of FIG. 5, eight servers, server A-server H, are shown communicating with an 8×1 converter 32. The 8×1 converter 32 communicates with the maintenance network 20, which communicates with the workstations 25–27 (FIG. 3). The difference between FIG. 5 and FIG. 3 is that the converter 32 replaces a number of independent converters 21–23 (for example, FIG. 3). When a workstation 25–27 needs to communicate with any one of the servers 31, the workstation sends the appropriate addressing information to the servers, the 8×1 converter 32 picks up the data for all eight servers 31, separates the data to the appropriate ports for each of the servers, server A-server H, and delivers respective KVM data to the appropriate server destined for the appropriate server. Thus, in the embodiment of FIG. 5, converter 32 not only retrieves KVM data from the maintenance network 20 and converts it into KVM signal data for the KVM ports of a server, it also sorts and delivers data received from the maintenance network 20 to any one of the eight different servers. Of course, other scalability factors (beyond 8×1) can be employed for converter 32.

Figure 7:
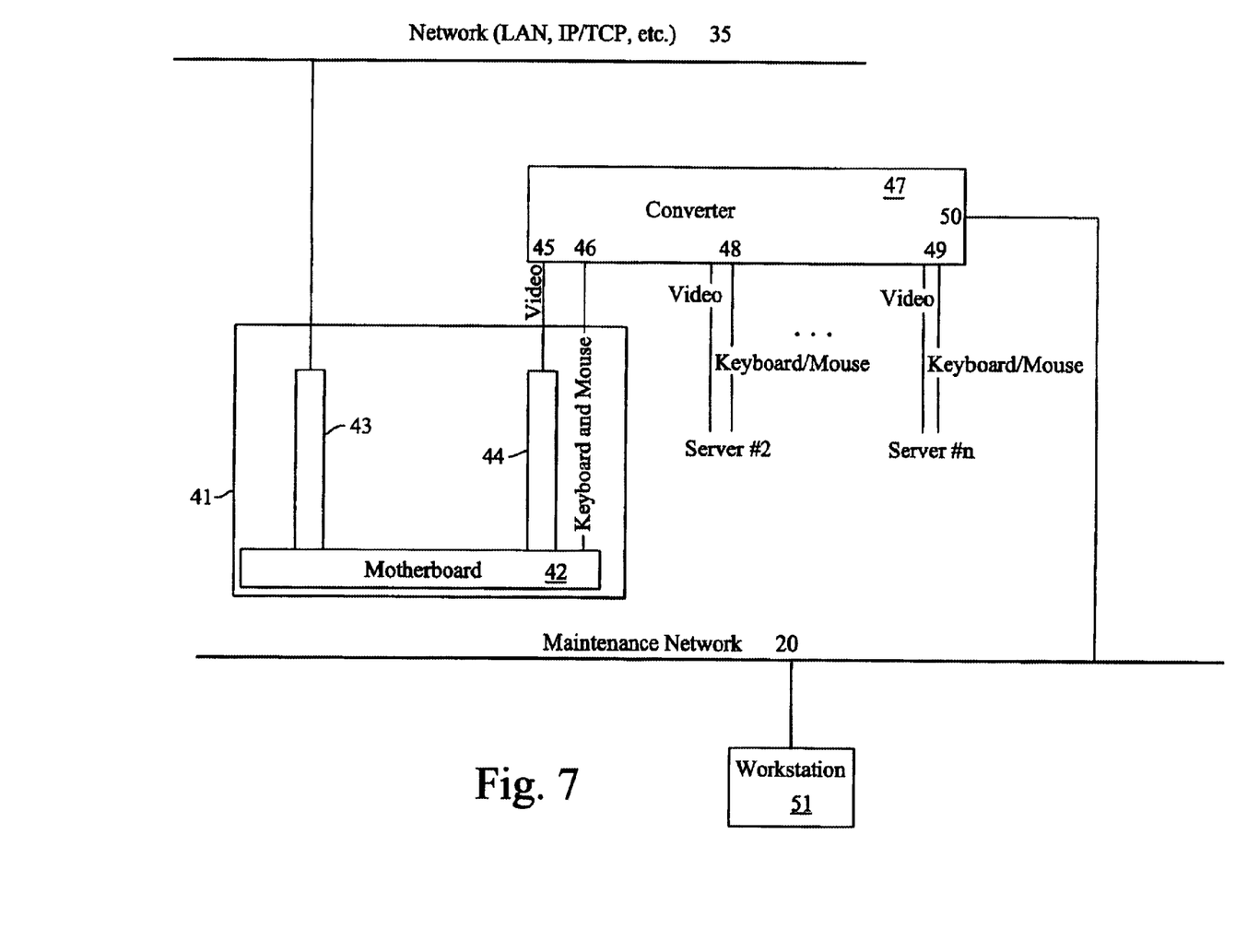
FIG. 7 is a schematic block diagram of an example server and converter in accordance with the present invention.

The schematic structure of the server and converter will now be described with respect to FIG. 7. In FIG. 7, the server 41 is shown including a motherboard 42, a network card 43, and a video card 44. Of course, other server components will be included in the server 41, which are not shown for purposes of brevity. The server 41 can be a standard PC with a network PCI card allowing the PC 41 to communicate via the network 35. The network 35 can be a LAN or other network and can follow the Ethernet, IP/TCP or other data protocol, without restriction. As is well-known, the server 41 will receive keyboard and mouse instructions from a keyboard and mouse connected to its keyboard and mouse ports at the motherboard 42 and can process those instructions using a processor on the motherboard to create appropriate data signals which are sent onto the network 35 via the network card 43. Further, the motherboard 42 can respond to the keyboard and mouse signals via a video processor, which communicates video refresh signals from the video card 44 to a video port. In the present invention, the converter 47 connects directly to the video, keyboard and mouse ports of the server 41. In particular, the video port from the video card 44 of the server 41 connects into a video port 45 of the converter 47. Similarly, keyboard and mouse ports of the server 41 (which connect directly to the motherboard 42), connect to keyboard and mouse ports 46 of the converter 47. If the converter 47 is of the type shown in FIG. 5 (for multiple servers) then the converter 47 will also include KVM ports 48 . . . 49 for n number of servers.

The converter 47 also communicates via a network card in the converter 47 (not shown) to the maintenance network 20 via network connection 50. The maintenance network 20 can be a LAN, Ethernet, ATM, IP/TCP, wireless, CAT-5, etc. The connection 50 and converter 47 network card will correspond to whichever network protocol is employed for network 20. Communicating with the maintenance network 20 is at least one workstation 51, and probably additional workstations (not shown).

As can be seen in FIG. 7, the converter 47 acts as an intermediary between the workstation 51, which communicates with the converter 47 via the maintenance network 20, and the motherboard 42 of the server 41. The converter 47 can be the so-called "Keyview II" product commercially available from Cybex Computer Products of Huntsville, Ala., and described in U.S. patent application Ser. No. 09/401,501 entitled "System and Method for Accessing and Operating Personal Computers Remotely," filed Sep. 22, 1999, the entire disclosure of which is incorporated herein by reference. Because the converter 47 connects directly to the keyboard and mouse ports of the server 41, it has motherboard access to the motherboard 42 of the server 41. The converter 47 thus can cause the motherboard 42 to perform cold boots and other functions which can be accomplished only via direct motherboard access. Thus, the embodiment of FIG. 7 allows the workstation 51 to perform functions at the motherboard 42 that the workstation 51 could not perform if it were simply connected to the network 35 and communicating with the motherboard 42 via the network card 43 and PCI bus of the server 41.

Thus, the present invention differs substantially from traditional remote access devices which communicate with a server via a server network card, server modem, etc., since such traditional systems do not gain the direct motherboard access that the computer of the present invention gains through the keyboard and mouse server ports.

As can be seen in FIG. 7, the server 41 can be a standard, over-the-counter server with a standard motherboard 42, standard video card 44 and standard keyboard and mouse ports. Further, the workstation 51 can be any type of workstation, including workstation types that may not be compatible with a selected server 41. Thus, by way of example only, the workstation 51 can be a Sun-type workstation and the server 41 can be a PC-server and the converter 47 will provide the necessary conversions to allow the workstation 51 to communicate with the server 41. The converters in the embodiment of FIG. 7 thus provide the convenience of allowing users to employ over-the-counter workstations 51 with over-the-counter computers 41.

Alternatively, the converter functions of the converter 47 can be incorporated into a server 41. That alternative embodiment, however, requires the server 41 to be customized to include the converter 47 hardware and software. Thus, the present invention can be embodied in the situation where the server is a standard over-the-counter server with an external converter 47, or where the server 41 is customized to include a converter card having the features of the converter 47 providing direct motherboard access, or where the converter functions are employed elsewhere in the server of the system.

Figure 6:
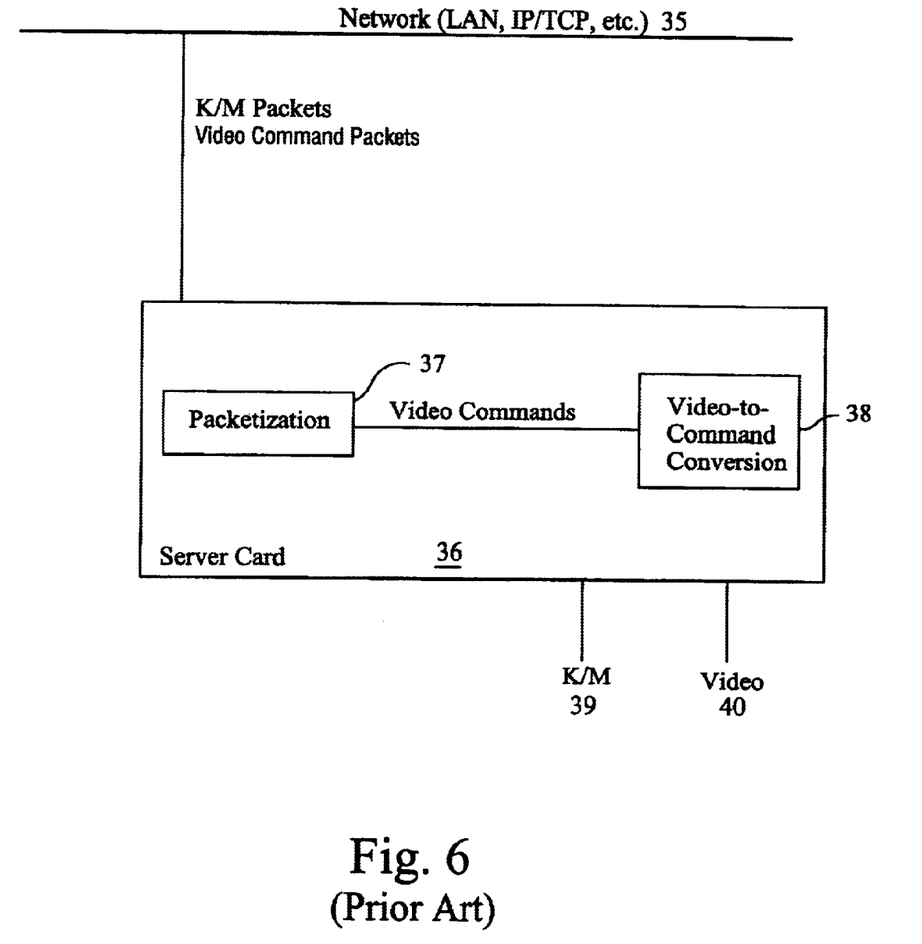
FIG. 6 is a schematic block diagram of a KVM to LAN conversion card.

The present invention is also different from prior art server cards 36 (FIG. 6) which receive keyboard and mouse commands 39 and video commands 40, and convert those commands into network packets for delivery onto a network 35. As shown in FIG. 6, some prior art systems accept keyboard and mouse data 39, packetize that data in a packetization function 37 and deliver the packeted keyboard mouse commands onto a network 35. Such server cards 36 can also accept video 40 into a video-to-command conversion unit 38 which converts the video signals into command types (such as draw a line from X Y coordinate to X1Y1 coordinate), which commands are packetized in packetization function 37 and delivered on the network 35. In contrast, the present invention, an example of which is shown in FIG. 7, takes digital video directly from the video port 47 into the network port 50, to the monitor of the workstation 51 via the maintenance network 20, and provides direct motherboard access by the workstation keyboard and mouse via the keyboard and mouse port 46 to the motherboard 42. Alternatively, the present invention can take digital video directly from a video frame buffer of the server.

Further, with respect to converter 47, since the converter 47 receives raw video at the video port 45, the converter 47 can convert video resolutions of the server 41 to match the resolutions required by the monitor at the workstation 51. The converter 47 thus provides scaling and resolution conversions to the video 45 in addition to packetization of the raw video data for transmission onto the maintenance network 20.

Figure 10:
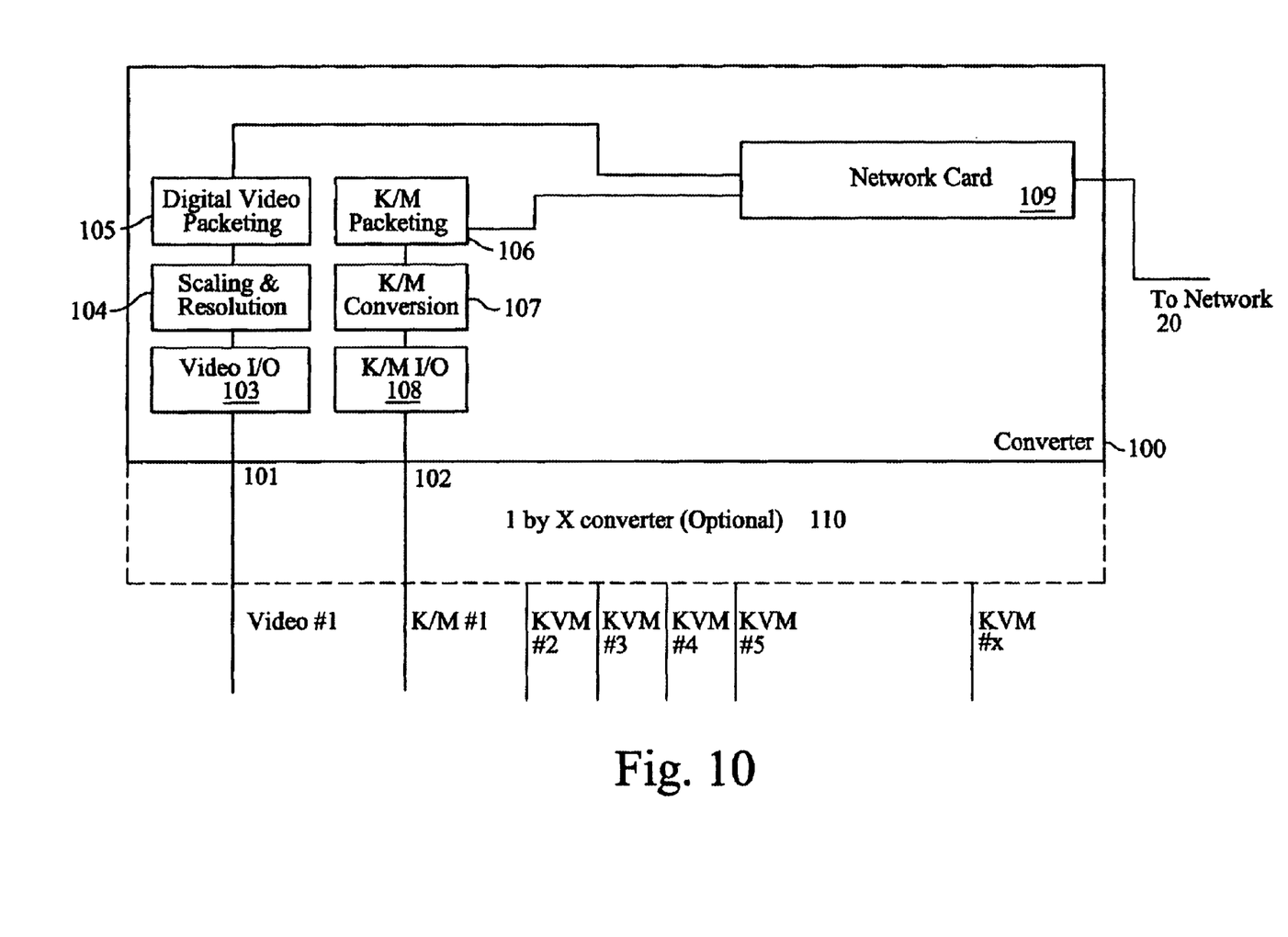
FIG. 10 is a schematic representation of an example converter in accordance with the present invention.

FIG. 10 illustrates an example converter in more detail. In FIG. 10, the video #1 signal and the K/M #1 signal from the video, keyboard and mouse ports of a server enter the converter 100 at 101 and 102. The converter 100 may optionally include a 1×N converter 110 (such as is described with respect to FIG. 5) such that KVM #2, KVM #3 . . . KVM #N signals can communicate with X number of servers and provide those signals to the network 20. The converter 100 receives the video signal from the server (for example server 11 in FIG. 4) at video port 101 and provides it to video input circuitry 103. The video input circuitry 103 may include amplifiers, conditioners, and other associated circuitry for video interfacing (as an alternative embodiment, the converter 100 can be incorporated into server 11 and take video signals directly from the server video frame buffer). The video input circuitry 103 provides the raw video data to a scaling resolution element 104. There, the raw video is scaled and resolved in accordance with the monitor used by the workstation (25–27) that will receive the raw video data from the network 20. The scaling and resolution circuitry 104 may be in accordance with that described in U.S. Pat. No. 5,917,552, Video Signal Interface System Utilizing Deductive Control (Leone), commonly owned (which is incorporated herein by reference).

Next, the raw video is packeted at digital video packeting element 105. This digital packeting can be performed in accordance with U.S. patent Ser. No. 08/909,924 by O'Dryna et al., (filed Aug. 12, 1997) and Ser. No. 09/100, 582 by O'Dryna et al. (filed Jun. 19, 1998), both commonly owned, both of which are incorporated herein by reference.

The keyboard and mouse signals come through on the K/M #1 line to converter port 102. As described previously, the keyboard and mouse connections provide direct access to the motherboard of the server. The keyboard and mouse port 102 connects to the keyboard mouse I/O 108 which condition signals to and from the server 11 keyboard and mouse ports. The keyboard and mouse signals then proceed to the keyboard mouse conversion element 107 where appropriate conversions are performed to ensure that the keyboard and mouse signals from the workstation and the server are consistent in format. Keyboard and mouse signals are packeted in element 106.

The converter 100 also includes elements communicating with the video I/O 103 and keyboard and mouse I/O 108 to answer command instructions provided by the server, for example at server boot-up. These instructions could include for example mouse protocols, keyboard standards, and monitor resolutions, etc.

Once the raw digital video is packeted at element 105 and the keyboard mouse signals are packeted at element 106, they are provided to the network card 109, which sends the packets onto the network 20, addressed to the appropriate workstation 25–27, etc.

Some elements of converter 100 have been omitted from FIG. 10 for purposes of brevity, but one can recognize that converter 100, to the extent not specifically shown in FIG. 10, otherwise operates in accordance with traditional KVM switches, such as are commercialized by Cybex as Autoview and xP series switches.

Figure 8:
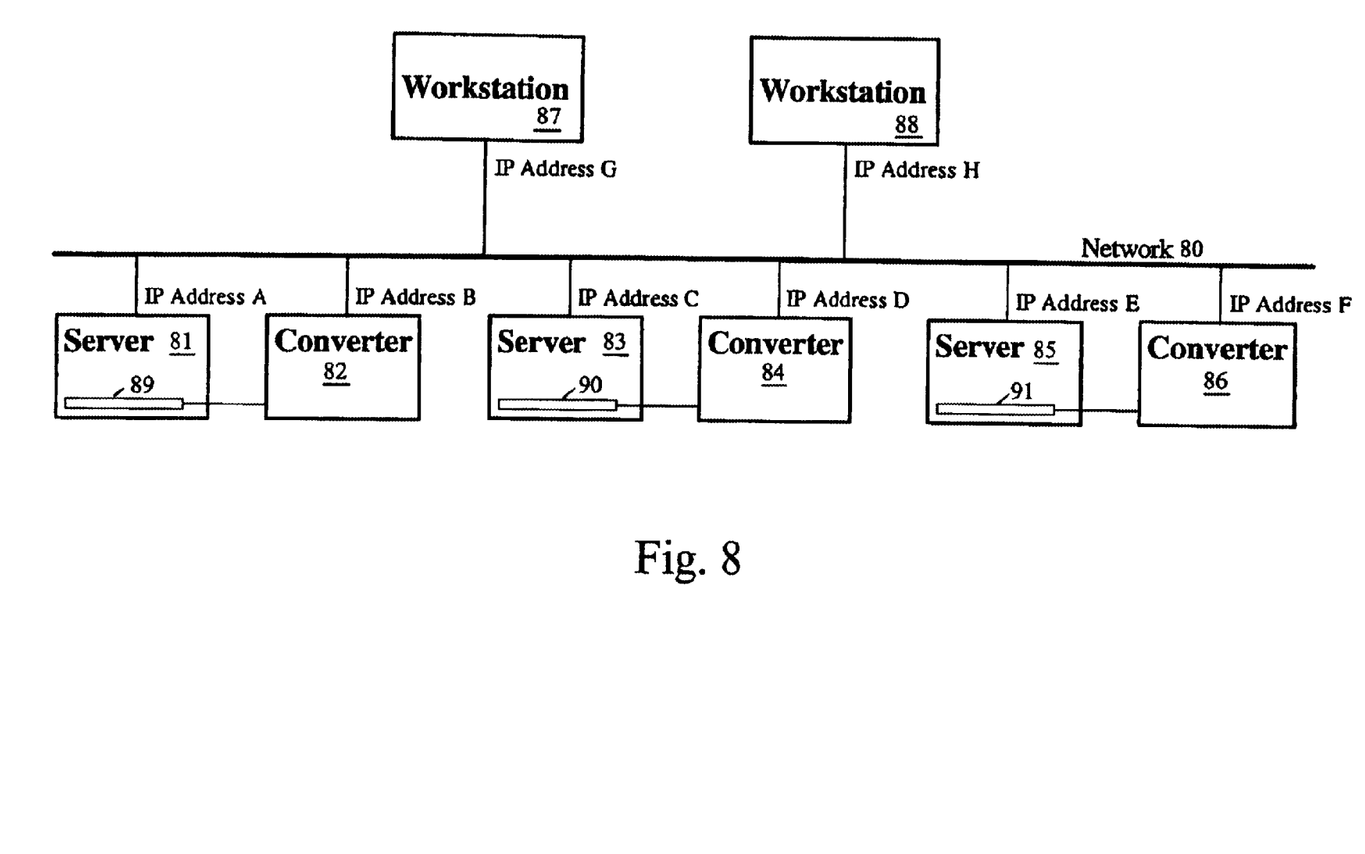
FIG. 8 is a schematic representation of an alternative example of the present invention.

FIG. 8 illustrates an alternative embodiment of the present invention in which the corporate network 10 and maintenance network 20 have been combined into a single network 80. As can be seen in FIG. 8, the workstations 87 and 88 communicate with the network 80, as do servers 81, 83, and 85, to which the workstations may gain KVM control. When the servers 81, 83 and 85 communicate with each other over the network 80, they do so by addressing each other directly over the network 80. Workstations 87 and 88 can also communicate with the servers directly by addressing data to the server themselves. When, however, the workstations 87 and 88 need further control over the servers 81, the workstations address the converters 82, 84 and 86 and the converters in turn transfer the keyboard, video, and mouse information to the associated server directly to the motherboards 89, 90, and 91.

Thus, in FIG. 8, if workstation 87 needs to control server 83, the workstation 87 would address the converter 84 at IP address D by sending keyboard, video and mouse information from its own IP address G to the IP address D of converter 84. The embodiment of FIG. 8 assumes an Internet protocol type data structure on the network 81, but of course other data protocols may be substituted therefore. Once the workstation 87 sends KVM data to the converter 84, the converter 84, which has hardwire connection to the motherboard 90 of server 83 via the keyboard and mouse ports of the server 83, provides the keyboard and mouse information to the motherboard 90 and the video information to the video card of the server 83 (not shown).

Figure 9:
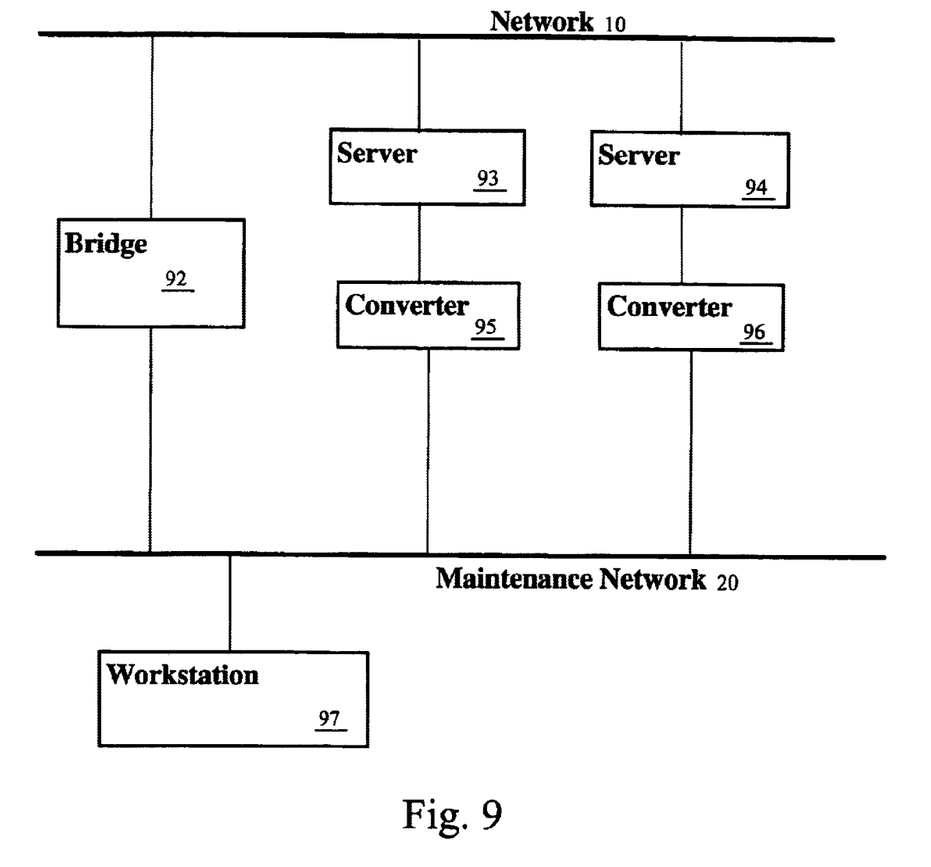
FIG. 9 is a schematic representation of another example embodiment of the present invention.

A still further embodiment of the present invention is shown in FIG. 9 in which network 10 and maintenance network 20 have associated servers 93 and 94 with associated converters 95 and 96 communicating therebetween. Workstation 97 communicates on maintenance network 20 and controls servers 93 and 94 via the converters 95 and 96, as described in detail above. In the embodiment of FIG. 9, however, bridge 92 connects network 10 and maintenance network 20, thus effectively tying network 10 and network 20 into a common network structure. In FIG. 9, the maintenance network 20 remains independent of the network 10 and yet the workstation 97 can still access server 93 and server 94 directly via bridge 92. The embodiment of FIG. 9 also provides the advantage of allowing the workstation 97 to get direct motherboard access to the servers 93 and 94 via converters 95 and 96, without employing the bridge 92.

While the invention has been particularly shown and described with reference to embodiments thereof, those skilled in the art will understand that the foregoing and other changes in form and detail may be made therein without departing from the spirit and scope of the present invention.

What is claimed is:

1. A converter providing an alternative data path between a selected server on a packet switched network and a workstation on the same packet switched network, said server communicating with said workstation via a corresponding network interface, the converter comprising:
   a motherboard access link communicating with a motherboard of the server, the motherboard access link being different from the network interface;
   a network link, different from the motherboard access link, providing access to the workstation through the same packet switched network; and
   a data converter to bi-directionally communicate data to and from the server and the workstation, without routing through the network interface of the server, by: 1) retrieving incoming data from the packet switched network addressed to the converter, and applying the incoming data to the motherboard access link according to a device protocol suited for the server, and 2) sending outgoing data from the server to the packet switched network by addressing it to the workstation according to a packet switched network protocol.

2. A system as in claim 1, wherein the incoming data prompts the server to communicate with another of the multiple servers on the multiple server network.

3. A system as in claim 1, wherein the converter permits motherboard access by any of the plurality of workstations to the server via the standard device port.

4. A system as in claim 1, wherein the converter permits motherboard access by only pre-designated ones of the plurality of workstations.

5. A keyboard, video and/or mouse data converter linking at least one server in a first network of servers via a network interface to at least one of a plurality of KVM workstations in a second network of KVM workstations, comprising:
   a keyboard interface coupled to a keyboard port of the server and providing direct motherboard access to the server through the keyboard interface and keyboard port;
   a mouse interface coupled to a mouse port of the server and providing direct motherboard access to the server through the mouse interface and mouse port;
   a video interface coupled to a video port of the server to interface with a video processor of the server;
   said respective keyboard, mouse and video ports being different from the network interface of the server;
   a workstation network interface providing network access to the second network of KVM workstations; and
   a data converter to bi-directionally communicate KVM information to and from the one server and the second network, said converter communicating said KVM information to and from the second network according to a local network protocol and communicating the KVM information to and from corresponding ones of the keyboard, mouse and video interfaces according to selected keyboard, mouse and video protocols suited for the one server.

6. A system as in claim 5, wherein:
   the workstation network interface has a unique device address on the second network, such that any of said KVM workstations communicate with the one server through the KVM converter by addressing KVM information to the unique device address.

7. A system as in claim 5, further including:
   a video packeting facility to receive digital video data from the one server and to packet the digital video data according to the local network protocol.

8. A system as in claim 5, further including:
   a scaling and resolution facility to receive digital video data from the one server via the video interface and scale a resolution of the digital video data from the one server to a resolution of a monitor associated with said KVM workstation.

9. A system as in claim 5, further including:
   a scaling and resolution facility to receive digital video data from the one server via the video interface and scale a resolution of the digital video data from the one server to a resolution of a monitor associated with said KVM workstation; and
   a video packeting facility to receive the digital video data from the scaling and resolution facility, to packet the digital video data according to the local network protocol, and deliver the packeting digital video data to the workstation network interface.

10. A system as in claim 5, wherein:

the data converter further receives the KVM information from the second network according to the local network protocol and separates the KVM information into keyboard signals destined for the keyboard interface according to a selected keyboard protocol suited for the one server and mouse signals destined for the mouse interface according to a selected mouse protocol suited for the one server.

11. A system as in claim 5, wherein:

the data converter receives the KVM information from the second data network including a cold-boot command sequence and provides said cold-boot command sequence directly to the motherboard of said server via at least one of the keyboard and mouse interfaces.

12. A method of linking at least one server in a first network of servers via a network interface to one of a plurality of keyboard, video and/or mouse information workstations in a second network of KVM workstations, comprising the steps of:

coupling through a keyboard interface to a keyboard port of the server to provide direct motherboard access to the server through the keyboard interface and keyboard port;

coupling through a mouse interface to a mouse port of the server to provide direct motherboard access to the server through the mouse interface and mouse port;

coupling through a video interface to a video port of the server to interface with a video processor of the server, said respective keyboard, mouse and video ports being different from the network interface of the one server;

providing network access to the second network of KVM workstations though a workstation network interface; and bi-directionally communicating KVM information to and from the one server and the second network though a data converter, said converter communicating said KVM information to and from the second network according to a local network protocol and communicating the KVM information to and from corresponding ones of the keyboard, mouse and video interfaces according to keyboard, mouse and video protocols suited for the one server.

13. A method as in 12, further including:

assigning the workstation network interface a unique device address on the second network, said KVM workstations communicating with the one server through the KVM converter by addressing KVM information to the unique device address.

14. A method as in claim 12, further including:

at the converter, receiving digital video data from the one server and packeting the digital video data according to the local network protocol.

15. A method as in claim 13, further including:

at the converter, receiving digital video data from the one server via the video interface and coordinating a resolution of the digital video data from the one server to a resolution of a monitor associated with said KVM workstation.

16. A method as in claim 15, wherein the coordinating step further includes:

scaling the digital video data.

17. A method as in claim 12, further including:

receiving digital video data from the one server via the video interface and coordinating a resolution of the digital video data from the one server to a resolution of a monitor associated with said KVM workstation; and receiving the digital video data after said coordinating, packeting the digital video data according to the local network protocol, and delivering the packeting digital video data to the workstation network interface.

18. A method as in claim 17, wherein the coordinating step further includes:

scaling the digital video data.

19. A method as in claim 12, further including:

receiving the KVM information from the second network according to the local network protocol and separating the KVM information into keyboard signals destined for the keyboard interface according to a keyboard protocol suited for the one server and mouse signals destined for the mouse interface according to a mouse protocol suited for the one server.

20. A method as in claim 12, further including:

receiving the KVM information from the second network including a cold-boot command sequence and providing said cold-boot command sequence directly to the motherboard of said server via at least one of the keyboard and mouse interfaces.

\* \* \* \* \*